(12) United States Patent
Tsukamoto

(10) Patent No.: US 11,620,744 B2
(45) Date of Patent: Apr. 4, 2023

(54) IMAGE INSPECTION DEVICE, IMAGE INSPECTION METHOD, AND IMAGE INSPECTION INSTRUCTIONS

(71) Applicant: Konica Minolta, Inc., Tokyo (JP)

(72) Inventor: Yasumasa Tsukamoto, Hino (JP)

(73) Assignee: Konica Minolta, Inc., Tokyo (JP)

( * ) Notice: Subject to any disclaimer, the term of this patent is extended or adjusted under 35 U.S.C. 154(b) by 388 days.

(21) Appl. No.: 17/028,041

(22) Filed: Sep. 22, 2020

(65) Prior Publication Data

US 2021/0118115 A1 Apr. 22, 2021

(30) Foreign Application Priority Data

Oct. 16, 2019 (JP) ............................. JP2019-189086

(51) Int. Cl.
*G06T 7/00* (2017.01)
*G06T 1/20* (2006.01)
*H04N 1/00* (2006.01)

(52) U.S. Cl.
CPC ............... *G06T 7/001* (2013.01); *G06T 1/20* (2013.01); *H04N 1/00018* (2013.01)

(58) Field of Classification Search
CPC . G06T 7/001; G06T 1/20; G06T 2207/30144; H04N 1/00018
See application file for complete search history.

(56) References Cited

U.S. PATENT DOCUMENTS

2015/0221077 A1* 8/2015 Kawabata ............... G06T 7/337
382/141
2019/0349496 A1 11/2019 Oki

FOREIGN PATENT DOCUMENTS

JP 2016-146514 A 8/2016

* cited by examiner

*Primary Examiner* — Christopher Wait
(74) *Attorney, Agent, or Firm* — Osha Bergman Watanabe & Burton LLP

(57) ABSTRACT

An image inspection device inspects an inspection image obtained by reading a sheet. The image inspection device includes a hardware processor that: performs inspection by comparing the inspection image with a reference image that is obtained by reading the original image that is printed on the sheet; determines whether a possibility of abnormality exists in the reference image based on a difference between the reference image and the inspection image; displays a difference portion between the reference image and the inspection image when determining that the possibility of abnormality exists in the reference image; receives a selection of a normality or an abnormality for each of the reference image and the inspection image; and replaces the reference image with the inspection image when the abnormality is selected for the reference image and the normality is selected for the inspection image.

21 Claims, 15 Drawing Sheets

IMAGE INSPECTION DEVICE, IMAGE INSPECTION METHOD, AND IMAGE INSPECTION INSTRUCTIONS

CROSS-REFERENCE TO RELATED APPLICATION

This application claims priority from Japanese patent application No. 2019-189086 filed on Oct. 16, 2019, including description, claims, drawings, and abstract, the entire disclosure of which is incorporated herein by reference.

BACKGROUND

1. Technical Field

The present invention relates to an image inspection device, an image inspection method, and image inspection instructions, and particularly to an image inspection device which inspects an image obtained by reading a sheet on which an original image is printed, an image inspection method using the image inspection device, and image inspection instructions which operate in the image inspection device.

2. Description of the Related Art

In printing, such as production printing, which requires high quality, quality inspection of printed matter is required. For example, there is known an image inspection device which inspects the quality of printed matter in such a manner that an image obtained by reading a sheet printed in a proof mode (test printing) is created in advance as a reference image, and an image (inspection image) obtained by reading a sheet printed in an inspection mode (main printing) is compared to the reference image.

For example, in Patent Literature 1(JP 2016-146514A), an image forming device is disclosed which includes an image forming unit which forms an image on a sheet, an image reading unit which reads a surface of the sheet on which the image is formed by the image forming device to generate a scan image, an image inspection unit which detects an abnormality in the scan image by comparing the scan image generated by the image reading unit with a normal image, and a history generation unit which generates, in a case where at least one abnormality is detected by the image inspection unit, a history image by generating detection information indicating that each abnormality is detected and embedding the generated detection information of each abnormality into the scan image. As the reference image, a scan image of a sheet determined to be normal when a user inspects the sheet on which the image is formed is used.

When the image obtained by reading the sheet printed in the proof mode is used as the reference image, the user visually confirms whether there is an abnormality such as a stain in the printed matter in the proof mode, and when there is no abnormality, the image is determined as the reference image. In this way, the user's visual confirmation is performed when the reference image is created. Thus, due to the user's oversight, a difference is detected by comparison inspection with the inspection image in the inspection mode (main printing) in a case where an abnormality is mixed in the reference image, and the inspection image is determined to be abnormal. Further, even in a case where an abnormality is found in the reference image by the user's visual confirmation, there is an issue that all pages are necessarily reprinted in order to recreate the reference image.

SUMMARY

One or more embodiments of the present invention provide an image inspection device, an image inspection method, and image inspection instructions capable of appropriately performing image inspection.

According to one or more embodiments of the present invention, an image inspection device, an image inspection method, and image inspection instructions comprise:

(1) An image inspection device which inspects an inspection image obtained by reading a sheet on which an original image is printed on the basis of a job, the image inspection device comprising a hardware processor that: performs inspection, with an image obtained by reading the sheet on which said original image is printed in a proof mode as a reference image, by comparing said reference image and said inspection image and determines whether there is a possibility of abnormality in said reference image on the basis of a difference between said reference image and said inspection image; displays a difference portion between said reference image and said inspection image in a case where it is determined that there is a possibility of abnormality in said reference image; allows a selection of a normality or an abnormality for each of said reference image and said inspection image; and replaces said reference image with said inspection image in a case where an abnormality is selected for said reference image, and a normality is selected for said inspection image.

(2) The image inspection device according to (1), wherein said hardware processor determines whether there is a possibility of abnormality in said reference image in a first copy of said job.

(3) The image inspection device according to (1), wherein said hardware processor further compares said original image and said inspection image and determines that there is a possibility of abnormality in said reference image in a case where there is a difference between said reference image and said inspection image, and there is no difference between said original image and said inspection image at the difference portion.

(4) The image inspection device according to (1), wherein said hardware processor further compares said original image and said inspection image and determines that there is a possibility of abnormality in said reference image in a case where there is a difference between said reference image and said inspection image, and there is a difference between said original image and said reference image at the difference portion.

(5) The image inspection device according to (1), wherein said hardware processor further compares said original image and said inspection image and determines that there is a possibility of abnormality in said reference image in a case where there is no difference between said reference image and said inspection image, and there is a difference between said original image and said reference image or said inspection image.

(6) The image inspection device according to (1), wherein said hardware processor suspends said job in a case where it is determined that there is a possibility of abnormality in said reference image.

(7) The image inspection device according to (6), wherein said hardware processor restarts said suspended job after replacing said reference image with said inspection image.

(8) The image inspection device according to (6), wherein said hardware processor restarts said suspended job and performs recovery printing in a case where a normality is selected for said reference image.

(9) The image inspection device according to (6), wherein said hardware processor stops said job in a case where an abnormality is selected for both said reference image and said inspection image.

(10) The image inspection device according to (1), further comprising a plurality of sheet discharge trays different from a normal sheet discharge tray, wherein said hardware processor discharges a sheet in which the difference is detected and a fed succeeding sheet separately to said plurality of sheet discharge trays in a case where it is determined that there is a possibility of abnormality in said reference image.

(11) An image inspection method in an image inspection device which inspects an inspection image obtained by reading a sheet on which an original image is printed on the basis of a job, the method comprising: executing an image inspection process of performing inspection, with an image obtained by reading the sheet on which said original image is printed in a proof mode as a reference image, by comparing said reference image and said inspection image and determines whether there is a possibility of abnormality in said reference image on the basis of a difference between said reference image and said inspection image; executing an inspection result display process of displaying a difference portion between said reference image and said inspection image in a case where it is determined that there is a possibility of abnormality in said reference image; executing a selection process of allowing a selection of a normality or an abnormality for each of said reference image and said inspection image; and executing a control process of replacing said reference image with said inspection image in a case where an abnormality is selected for said reference image, and a normality is selected for said inspection image.

(12) The image inspection method according to (11), wherein in said image inspection process, determining whether there is a possibility of abnormality in said reference image in a first copy of said job.

(13) The image inspection method according to (11), wherein in said image inspection process, further comparing said original image and said inspection image and determining that there is a possibility of abnormality in said reference image in a case where there is a difference between said reference image and said inspection image, and there is no difference between said original image and said inspection image at the difference portion.

(14) The image inspection method according to (11), wherein in said image inspection process, further comparing said original image and said inspection image and determining that there is a possibility of abnormality in said reference image in a case where there is a difference between said reference image and said inspection image, and there is a difference between said original image and said reference image at the difference portion.

(15) The image inspection method according to (11), wherein in said image inspection process, further comparing said original image and said inspection image and determining that there is a possibility of abnormality in said reference image in a case where there is no difference between said reference image and said inspection image, and there is a difference between said original image and said reference image or said inspection image.

(16) The image inspection method according to (11), wherein in said control process, suspending said job in a case where it is determined that there is a possibility of abnormality in said reference image.

(17) The image inspection method according to (16), wherein in said control process, restarting said suspended job after said reference image is replaced with said inspection image.

(18) The image inspection method according to (16), wherein in said control process, restarting said suspended job and performing recovery printing in a case where a normality is selected for said reference image.

(19) The image inspection method according to (16), wherein in said control process, stopping said job in a case where an abnormality is selected for both said reference image and said inspection image.

(20) The image inspection method according to (11), wherein said image inspection device includes a plurality of sheet discharge trays different from a normal sheet discharge tray, the method further comprising: executing a sheet discharge process of discharging a sheet in which the difference is detected and a fed succeeding sheet separately to said plurality of sheet discharge trays in a case where it is determined that there is a possibility of abnormality in said reference image.

(21) A non-transitory recording medium storing computer readable image inspection instructions which operate in an image inspection device which inspects an inspection image obtained by reading a sheet on which an original image is printed on the basis of a job, the instructions causing a computer to execute: performing inspection, with an image obtained by reading the sheet on which said original image is printed in a proof mode as a reference image, by comparing said reference image and said inspection image and determining whether there is a possibility of abnormality in said reference image on the basis of a difference between said reference image and said inspection image; displaying a difference portion between said reference image and said inspection image in a case where it is determined that there is a possibility of abnormality in said reference image; allowing a selection of a normality or an abnormality for each of said reference image and said inspection image; and replacing said reference image with said inspection image in a case where an abnormality is selected for said reference image, and a normality is selected for said inspection image.

The features and characteristics of this invention other than those set forth above will become apparent from the description given herein below with reference to embodiments illustrated in the accompanying drawings.

BRIEF DESCRIPTION OF THE DRAWING

The advantages and features provided by one or more embodiments of the present invention will become more fully understood from the detailed description given hereinbelow and the appended drawings which are given by way of illustration only, and thus are not intended as a definition of the limits of the present invention.

DETAILED DESCRIPTION

Hereinafter, embodiments of the present invention will be described with reference to the drawings. However, the scope of the invention is not limited to the disclosed embodiments.

As described in the related art, the image inspection device is known which inspects the quality of printed matter in such a manner that the reference image obtained by reading the sheet printed in the proof mode (test printing) is compared to the inspection image obtained by reading the sheet printed in the inspection mode (main printing) (for example, Patent Literature 1). However, in the conventional technology, the user inspects the image obtained by reading the sheet printed in the proof mode before the main printing and registers the image as the reference image when there is no problem.

Figure 16:
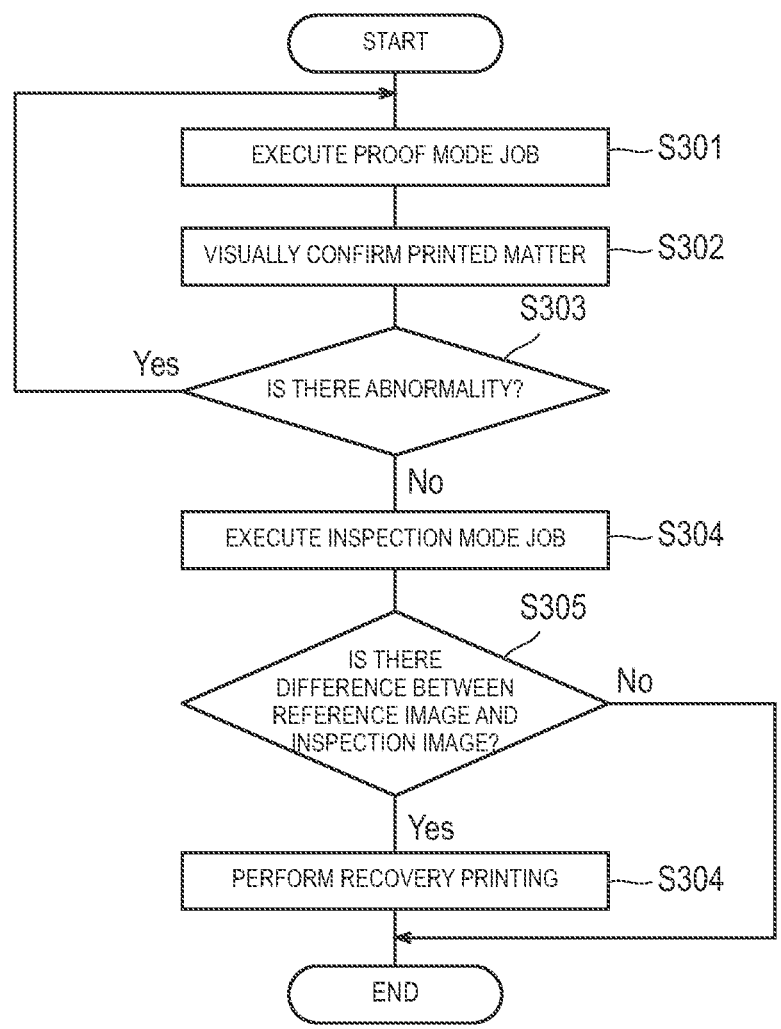
FIG. 16 is a flowchart illustrating an operation of a conventional image inspection system.

FIG. 16 is an example of a workflow of the conventional technology. First, a proof mode job (a job for test printing) is executed, and the image obtained by reading the printed sheet is registered as the reference image (S301). Next, the user visually confirms the printed matter in the proof mode (S302) and determines whether or not there is an abnormality in the printed matter (S303). In a case where an abnormality is found (Yes in S303), the image obtained by reading the sheet printed in the proof mode cannot be used as the reference image, the process returns to S301, and the proof mode job is executed again.

On the other hand, in a case where no abnormality is found (No in S303), the inspection mode job (a job for main printing) is executed (S304), and it is determined whether or not a difference between the reference image and the inspection image is detected in the inspection mode job (S305). In a case where a difference is detected (Yes in S305), recovery printing is performed (S306), and in a case where no difference is detected (No in S305), the job is ended.

In such a workflow of the conventional technology, in a case where, due to a users oversight, the inspection mode job is executed in a state where an abnormality is mixed in the reference image in S303, the difference is detected so that the printed matter is determined to be abnormal even when there is no problem with the printed matter of the inspection mode job, and the recovery printing is performed. In this case, since an abnormality is mixed in the reference image, it is not determined to be normal no matter how many times the recovery printing is executed. Thus, the user necessarily stops the job and start over from executing the proof mode job again.

Figure 17:
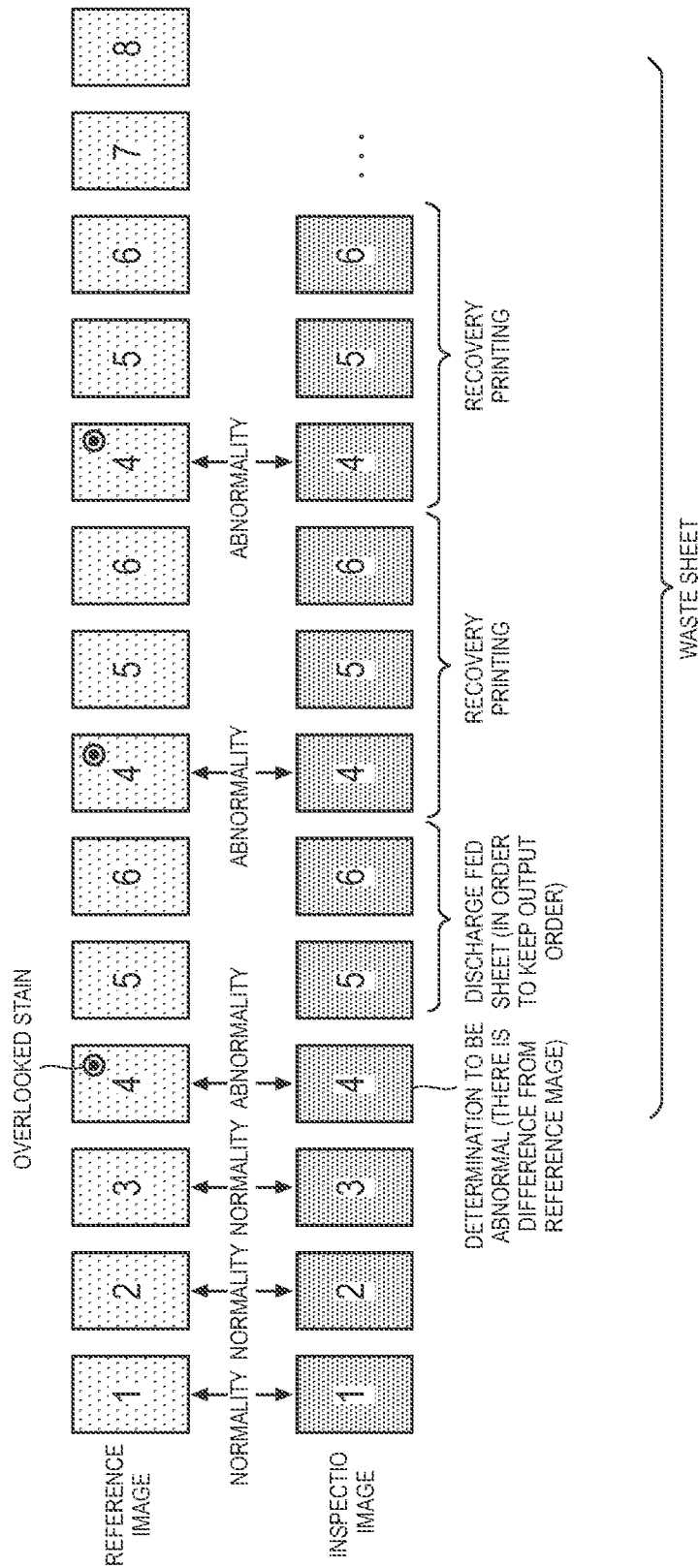
FIG. 17 is a schematic diagram illustrating a conventional image inspection method.

FIG. 17 is an operation example when the user overlooks a stain on the printed sheet in the proof mode in the conventional technology. The upper stage is the reference image read in the proof mode job, and the lower stage is the inspection image read in the inspection mode job. Further, the numbers in the rectangular frames are page numbers, and different types of hatching are applied to the reference image and the inspection image so that the reference image and the inspection image can be distinguished from each other.

As illustrated in FIG. 17, it is assumed that in a print job of eight pages, a stain is attached to the fourth page in the proof mode job. In a case where the user visually confirms the printed matter in the proof mode job, and the stain on the fourth page is overlooked, the stain is mixed in the reference image. Even in a case where the fourth page of the inspection mode job to be executed continuously has no stains and is printed normally, a difference is detected in the comparison inspection with the reference image obtained by reading the sheet printed in the proof mode job, and thus it is determined to be an inspection abnormality. In this example of the image inspection device, in order to keep the output order of the printed sheets, the fed fifth and sixth pages are also discharged together with the fourth page in which the difference is detected, and the recovery printing is performed from the fourth page.

However, since there is an abnormality in the reference image on the fourth page, the printing is not completed normally no matter how many times the recovery printing is performed thereafter, and all the sheets output after the fourth page become waste sheets. In this way, the user's visual confirmation is performed when the reference image is created. Thus, in a case where an abnormality is mixed in the reference image due to the users oversight, a difference is detected in the inspection mode job, the inspection mode job does not end normally in S305, and in order to recreate the reference image, the process returns to S301, and all pages are necessarily reprinted. Further, even in a case where an abnormality is found in the reference image in S303 by the users visual confirmation, in order to recreate the reference image, the process returns to S301, and all pages are necessarily reprinted.

In this regard, in one or more embodiments of the present invention, in a case where there is a possibility of abnormality in the reference image, the reference image is replaced with an inspection image determined by the user to be non-defective. Specifically, an image inspection device which inspects an inspection image obtained by reading a sheet on which an original image is printed on the basis of a job is provided with a control unit, an image inspection unit which performs inspection, with an image obtained by reading the sheet on which the original image is printed in a proof mode as a reference image, by comparing the reference image and the inspection image and determines whether there is a possibility of abnormality in the reference image on the basis of a difference between the reference image and the inspection image, an inspection result display unit which displays a difference portion between the reference image and the inspection image in a case where it is determined that there is a possibility of abnormality in the reference image, and a selection unit which allows a selection of a normality or an abnormality for each of the reference image and the inspection image. The control unit replaces the reference image with the inspection image in a case where the abnormality is selected for the reference image, and the normality is selected for the inspection image.

As a result, even in a case where an abnormality is mixed in the reference image, the image inspection can be appropriately performed without executing recovery printing many times and reprinting all pages in the proof mode job.

Embodiments

Figure 1:
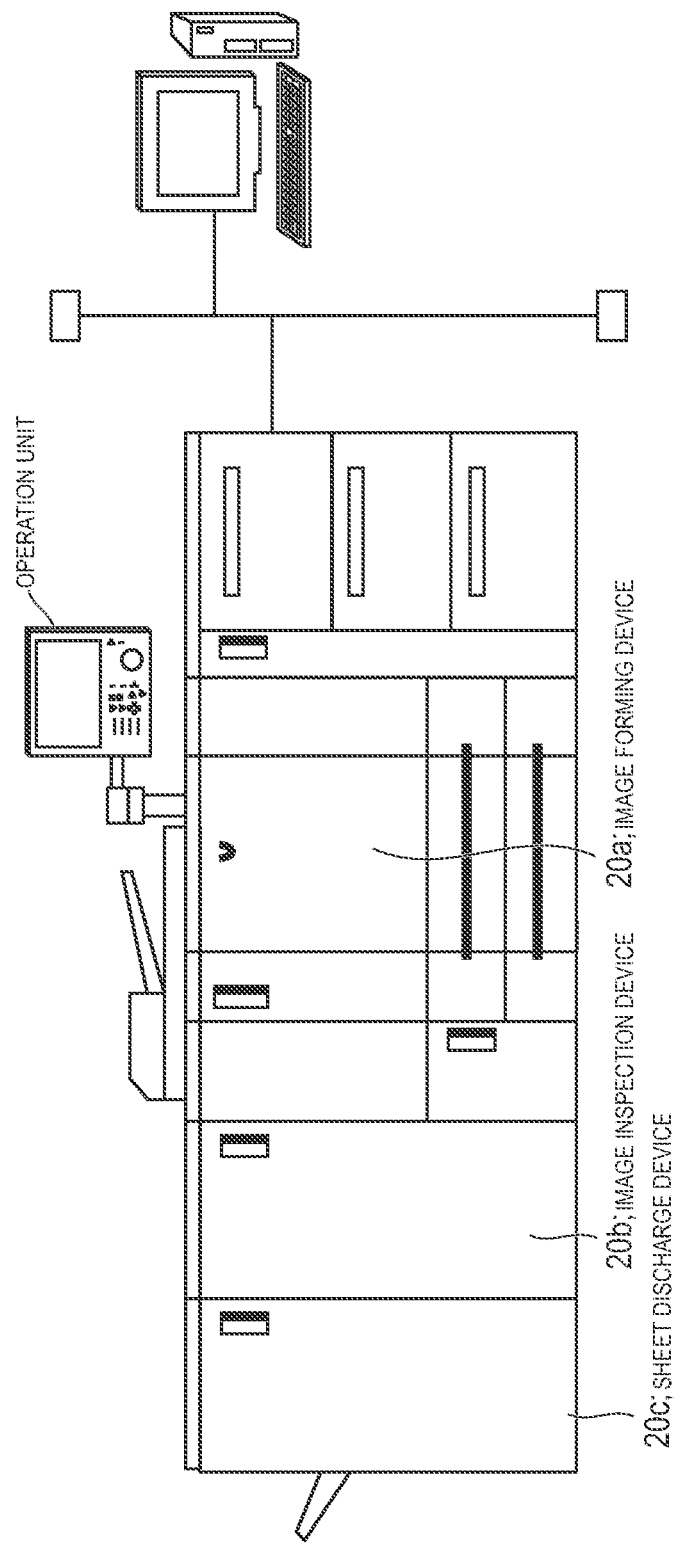
FIG. 1 is a schematic diagram illustrating a configuration of an image inspection system according to one or more embodiments of the present invention.
Figure 2:
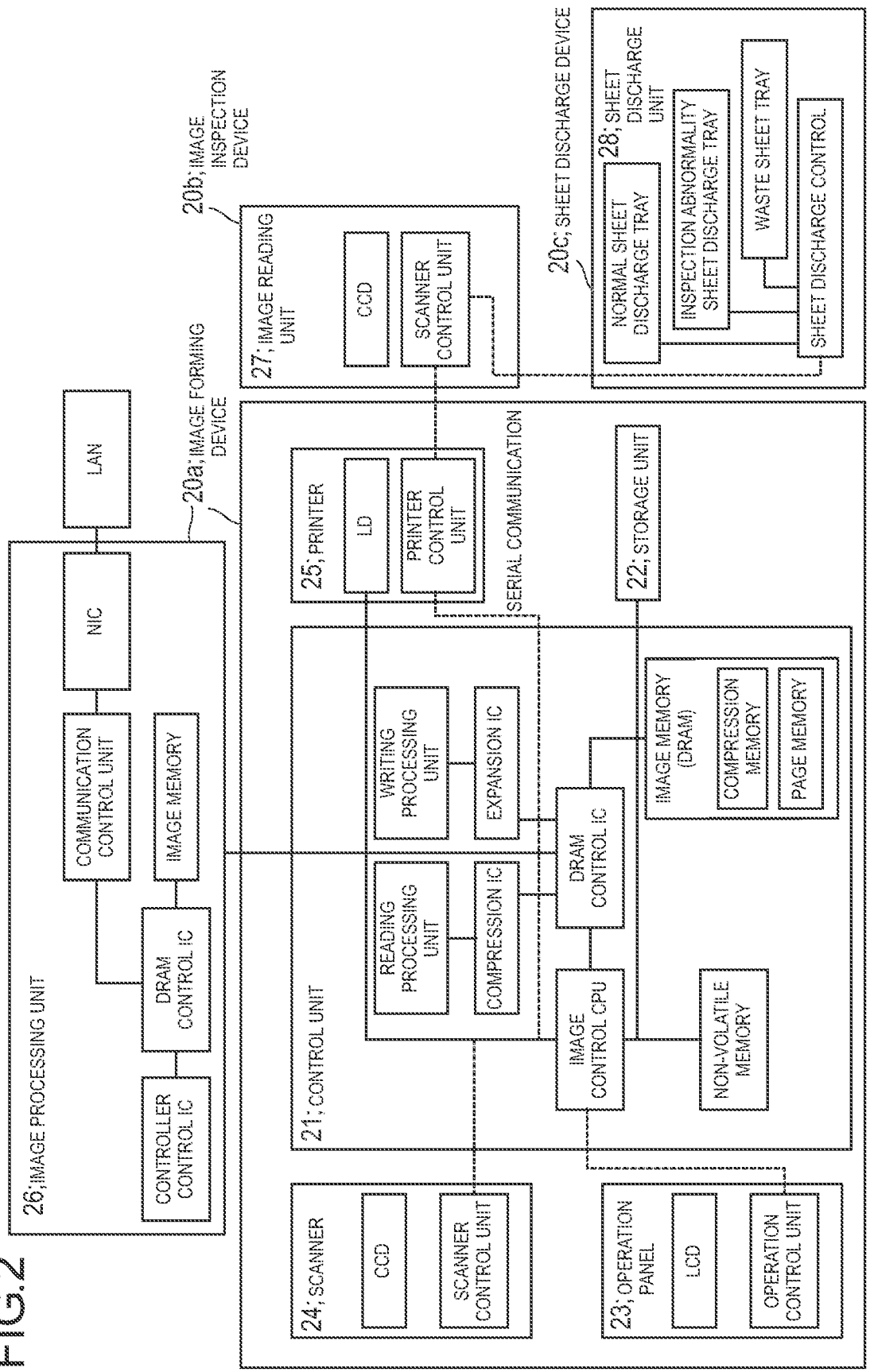
FIG. 2 is a block diagram illustrating the configuration of the image inspection system according to one or more embodiments of the present invention.
Figure 3:
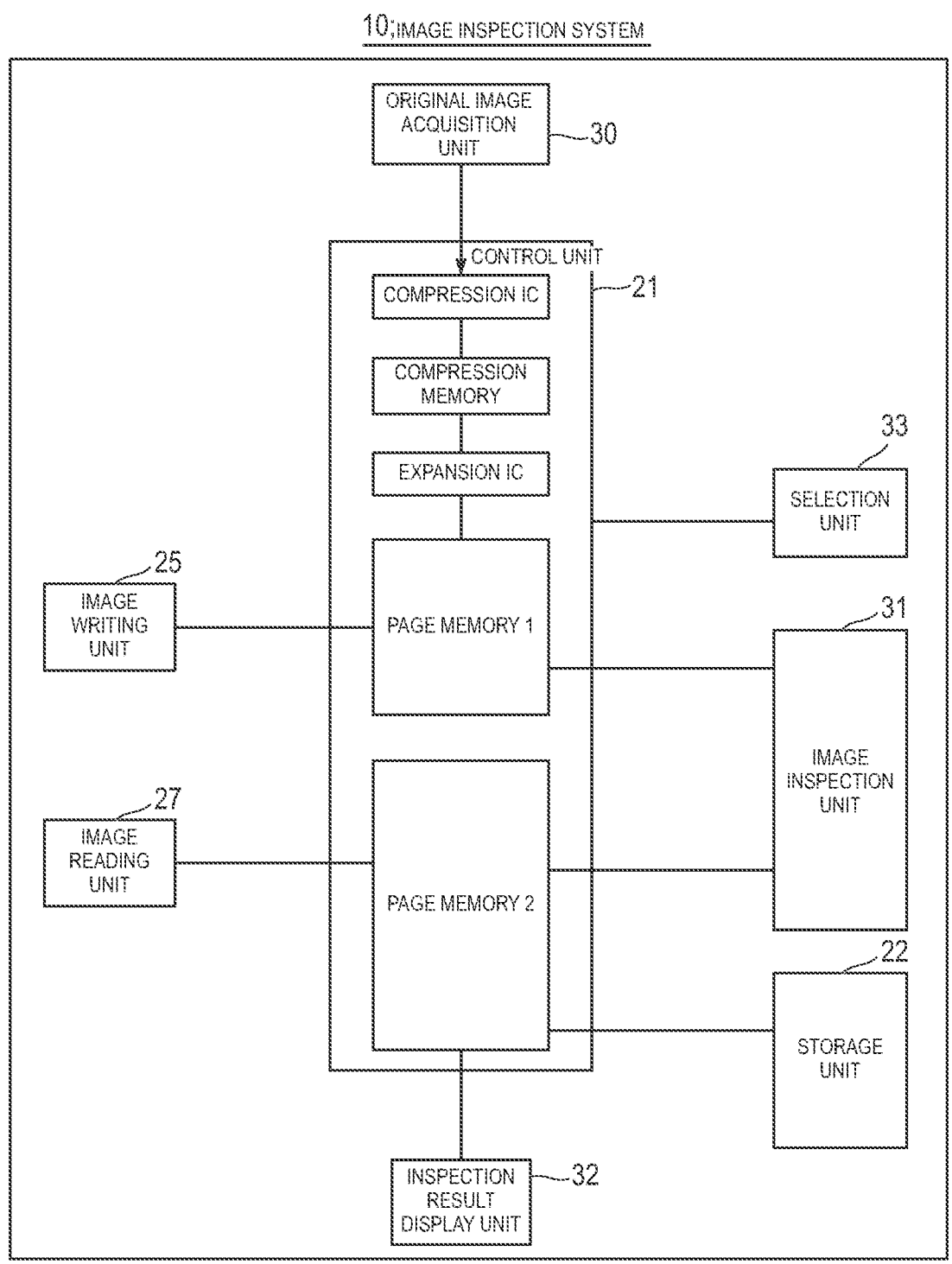
FIG. 3 is a block diagram illustrating a main configuration of the image inspection system relating to an image inspection method of one or more embodiments of the present invention.
Figure 4:
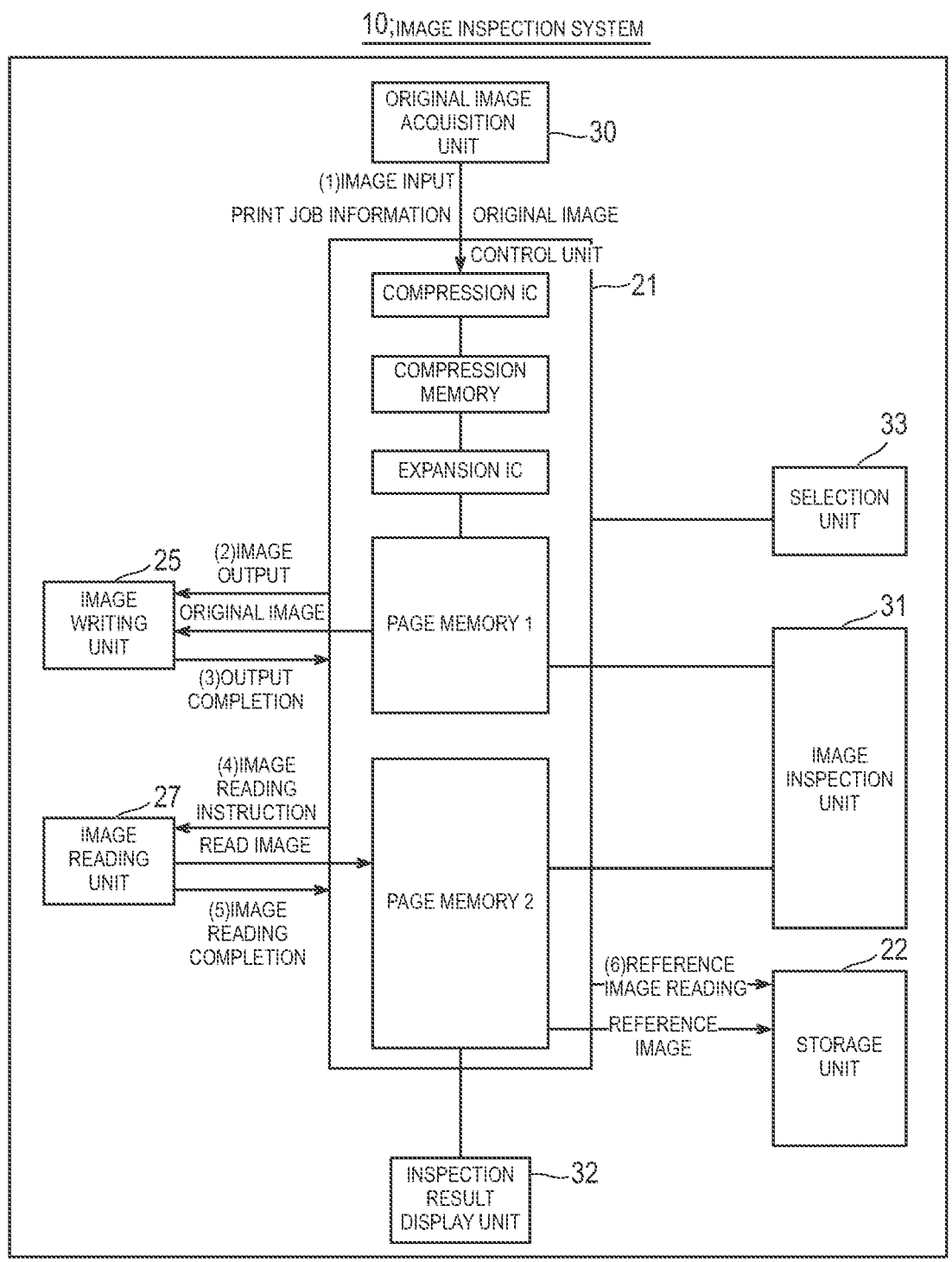
FIG. 4 is a schematic diagram illustrating a schematic operation of the image inspection system according to one or more embodiments of the present invention.
Figure 5:
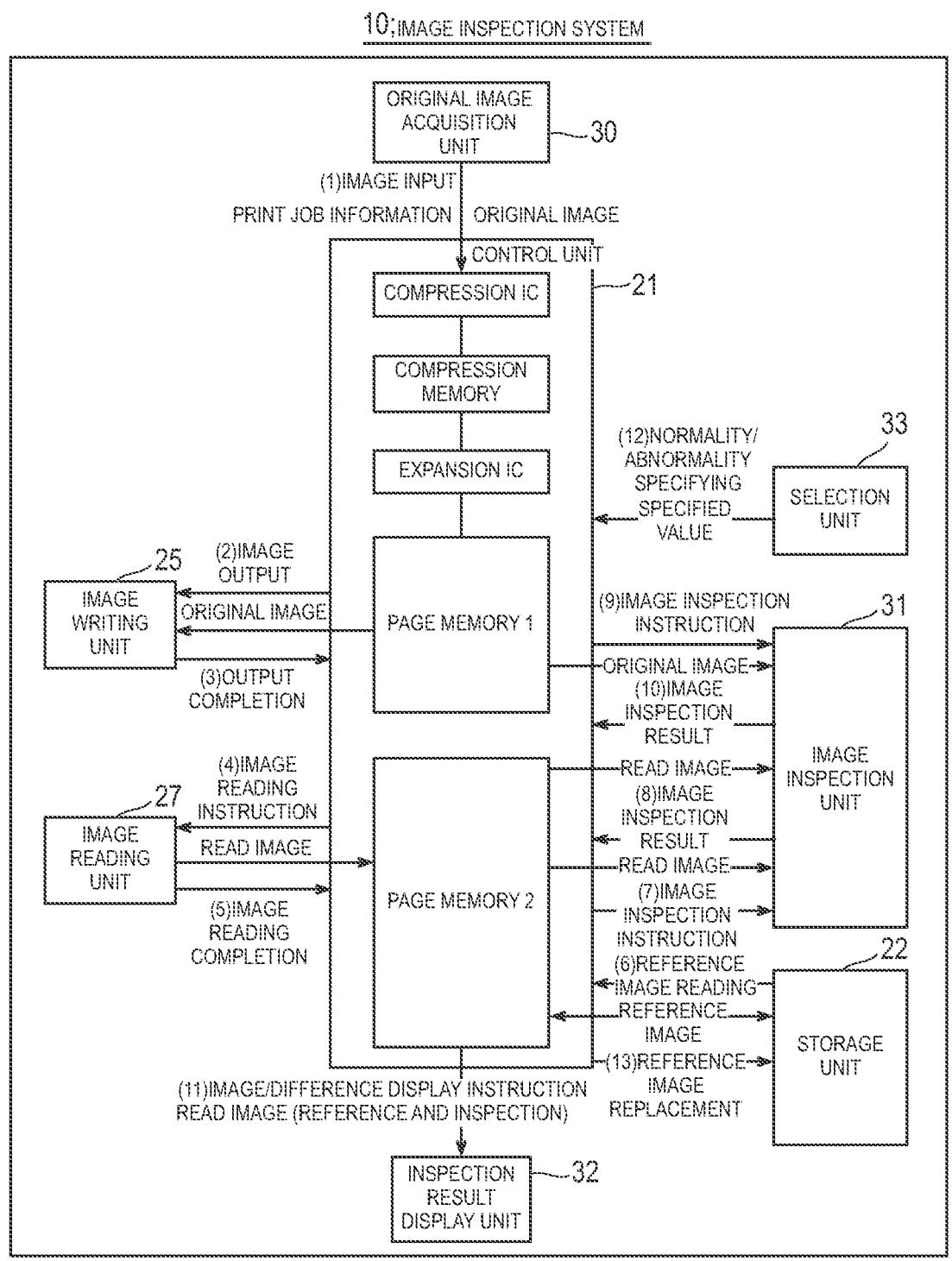
FIG. 5 is a schematic diagram illustrating a schematic operation of the image inspection system according to one or more embodiments of the present invention.
Figure 6:
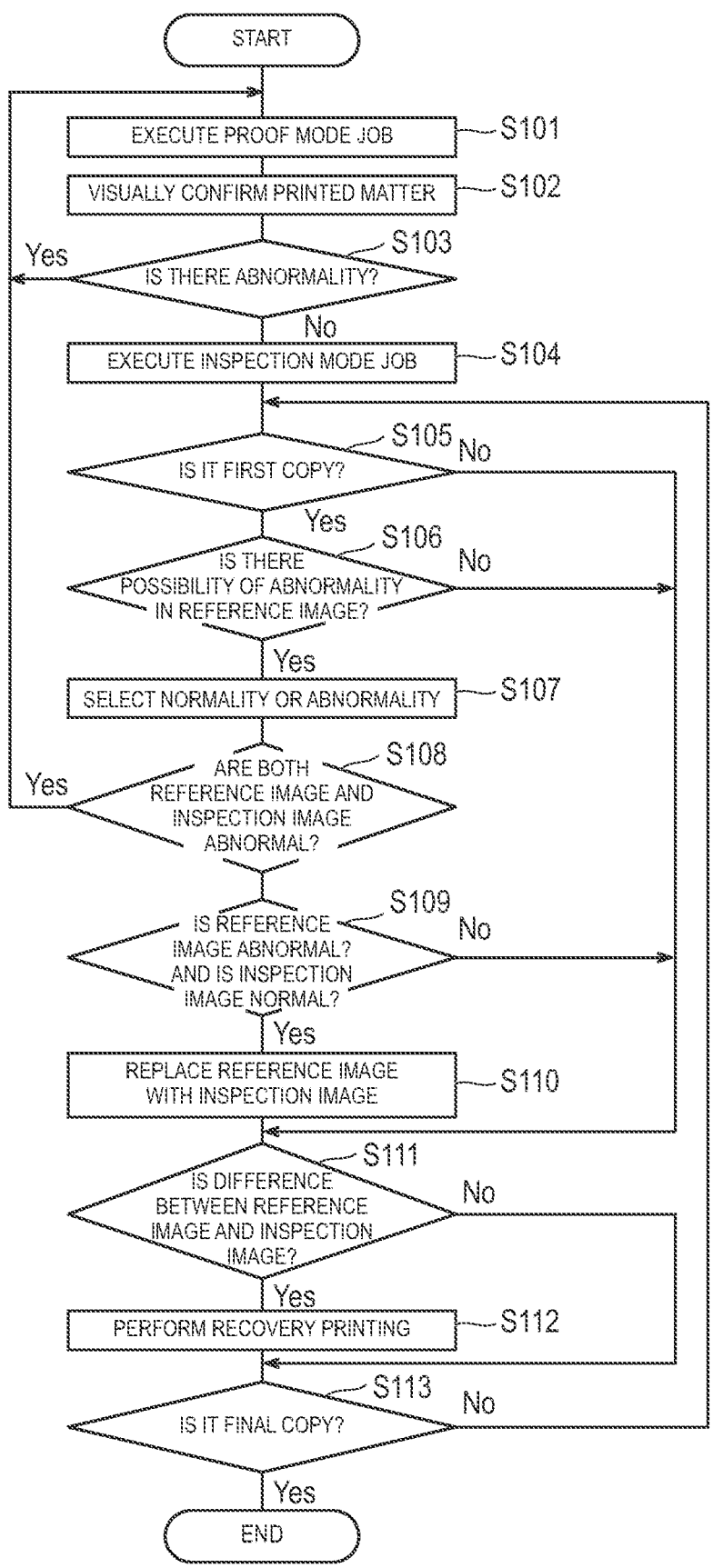
FIG. 6 is a flowchart illustrating an operation of the image inspection system according to one or more embodiments of the present invention.
Figure 7:
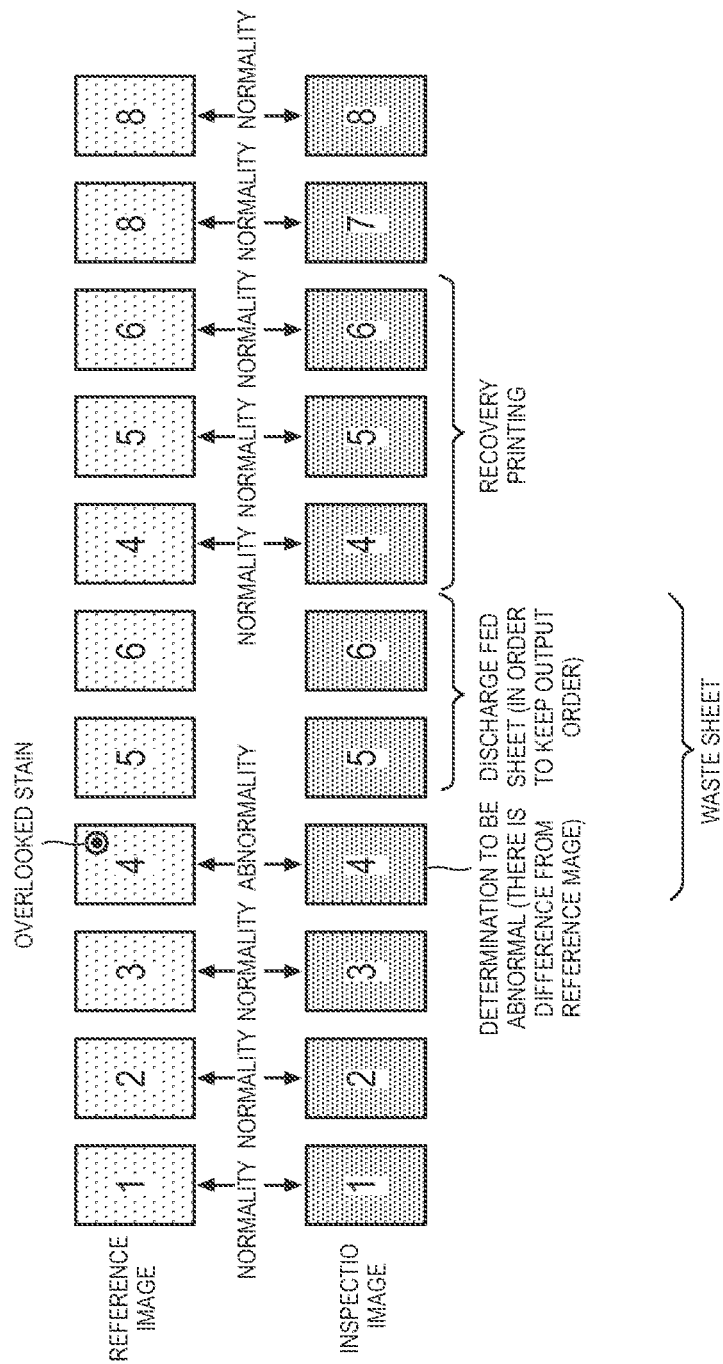
FIG. 7 is a schematic diagram illustrating the image inspection method according to one or more embodiments of the present invention.
Figure 8:
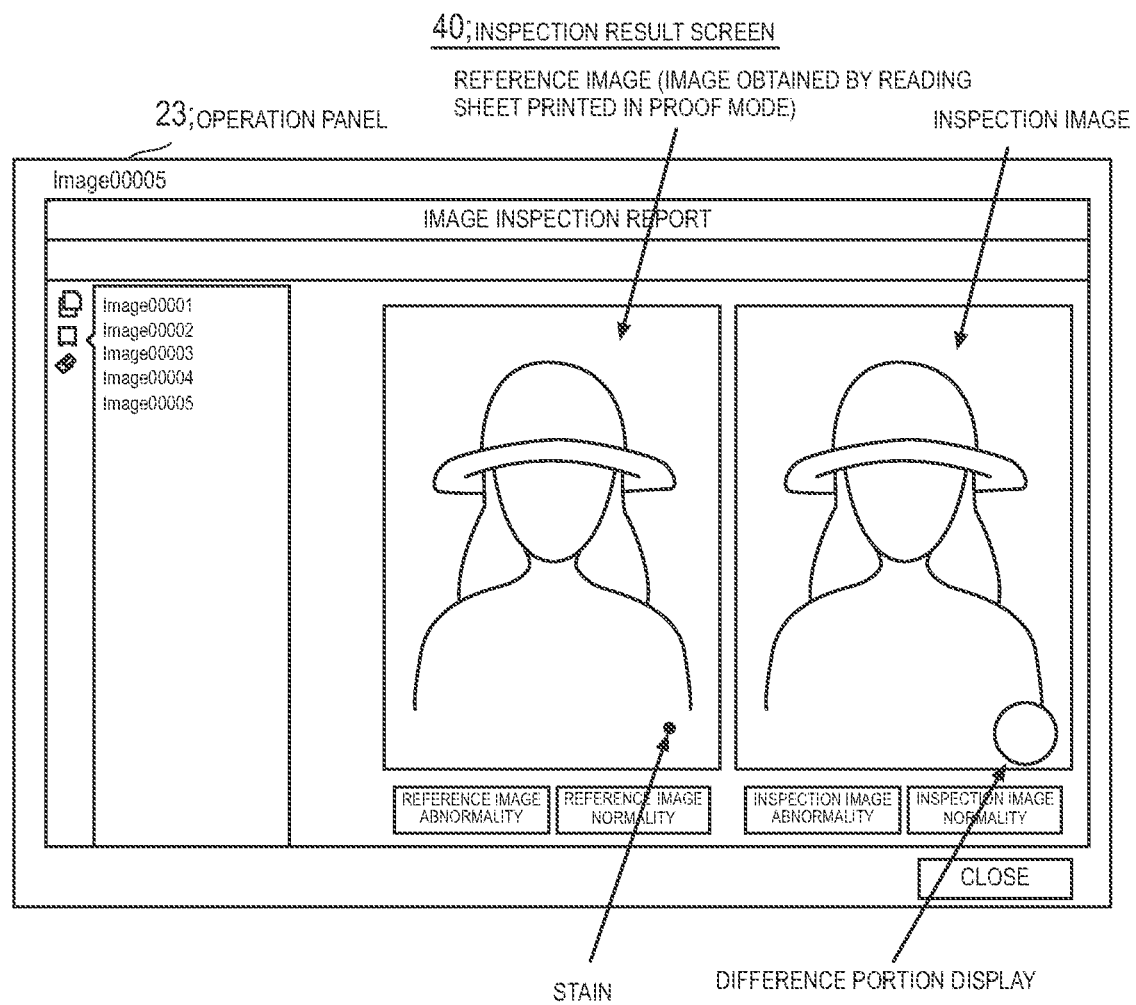
FIG. 8 is an example of a screen (inspection result screen) displayed on the image inspection system according to one or more embodiments of the present invention.
Figure 9:
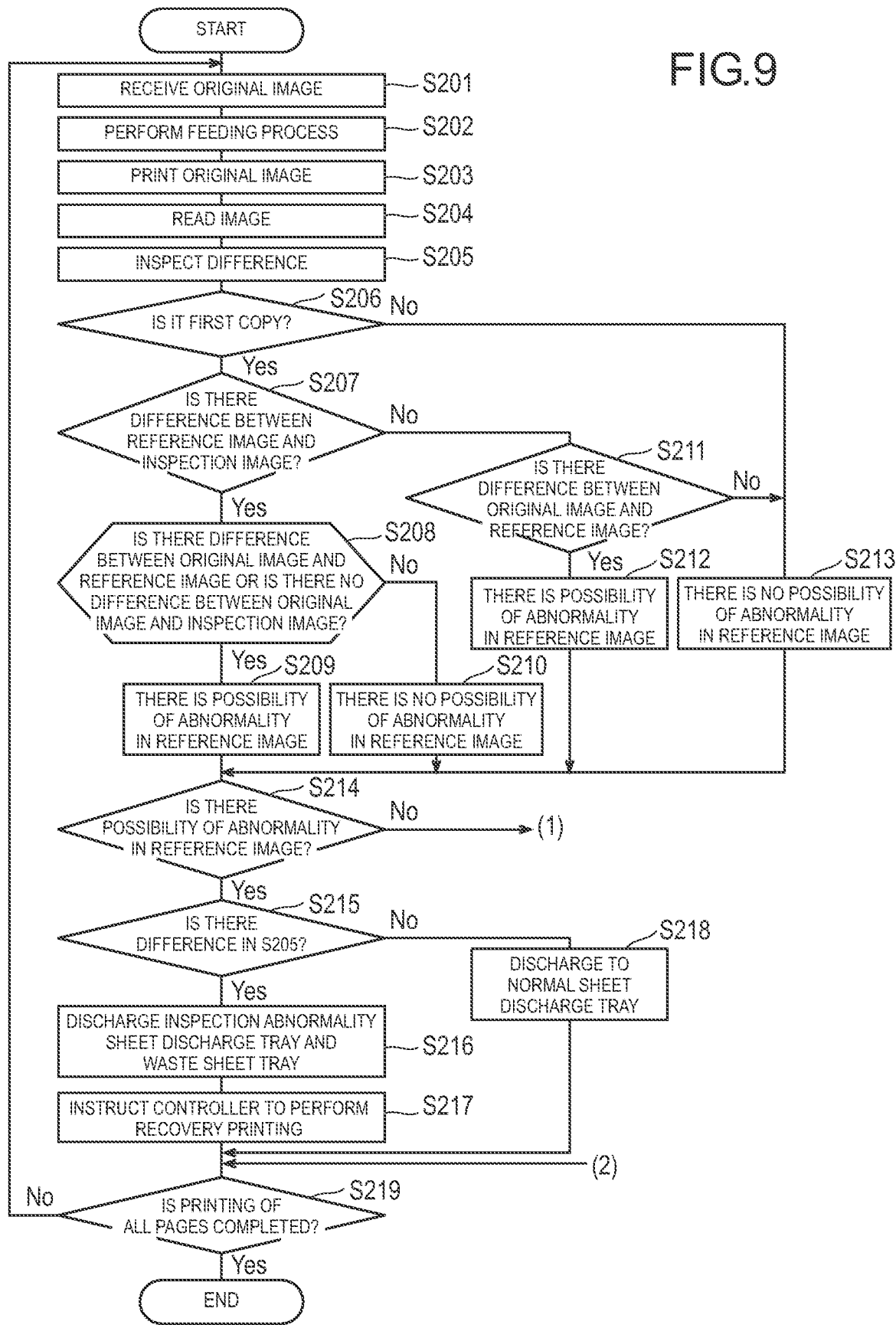
FIG. 9 is a flowchart illustrating the operation of the image inspection system according to one or more embodiments of the present invention.
Figure 10:
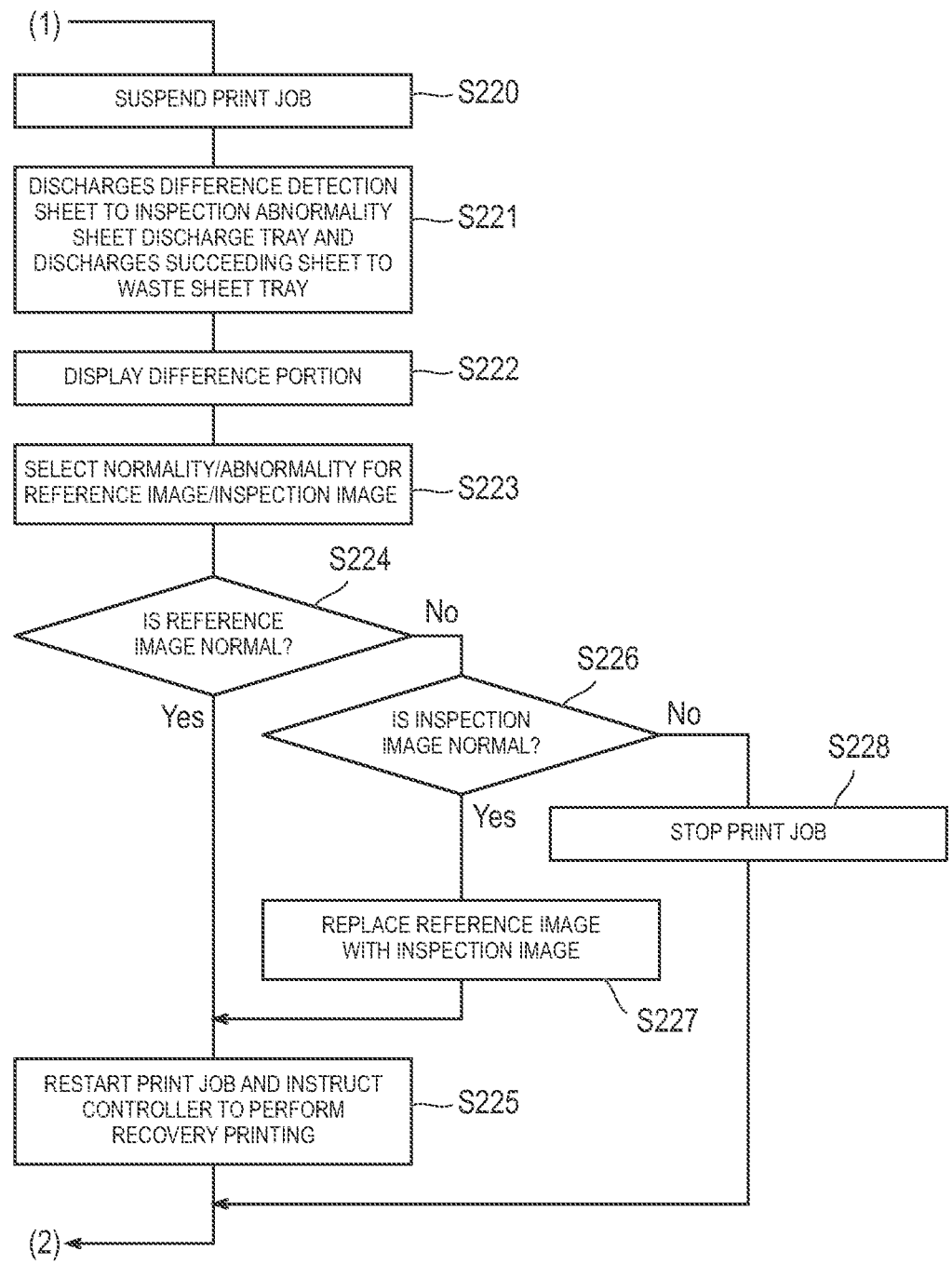
FIG. 10 is a flowchart illustrating the operation of the image inspection system according to one or more embodiments of the present invention.

In order to describe the above-described embodiments of the present invention in more detail, an image inspection device, an image inspection method, and image inspection instructions according to one or more embodiments of the present invention will be described with reference to FIGS. 1 to 15. FIG. 1 is a schematic diagram illustrating a configuration of an image inspection system of one or more embodiments, and FIG. 2 is a block diagram illustrating the configuration of the image inspection system. Further, FIG. 3 is a block diagram illustrating a main configuration of the image inspection system relating to the image inspection method of one or more embodiments, and FIGS. 4 and 5 are schematic diagrams illustrating a schematic operation of the image inspection system of one or more embodiments. Further, FIGS. 6, 9 and 10 are flowcharts illustrating the operation of the image inspection system of one or more embodiments, FIG. 7 is a schematic diagram illustrating the image inspection method according to one or more embodiments, and FIG. 8 is an example of a screen (inspection result screen) displayed on the image inspection system of one or more embodiments. Further, FIGS. 11A to 14B are schematic diagrams for describing a case where there is a possibility of abnormality in the reference image in the image inspection of one or more embodiments, and FIG. 15 is a schematic diagram illustrating a configuration of a sheet discharge device of the image inspection system of one or more embodiments.

Incidentally, in the following description, an operation mode in which a printed matter to be a product is created is referred to as an inspection mode, and an operation mode in which test printing of the printed matter is performed before the inspection mode is referred to as a proof mode. Further, an image obtained by reading a sheet printed in the inspection mode is referred to as an inspection image, and an image serving as a reference when inspecting the inspection image is referred to as a reference image.

As illustrated in FIG. 1, an image inspection system 10 according to one or more embodiments includes an image forming device 20a which prints an original image on a sheet, an image inspection device 20b which reads and inspects the printed sheet, a sheet discharge device 20c which sorts and discharges the printed sheet, and the like.

FIG. 2 is a block diagram illustrating the configuration of the image inspection system 10 of one or more embodiments. As illustrated in FIG. 2, the image forming device 20a includes a control unit 21, a storage unit 22, an operation panel 23, a scanner (image reading unit) 24, a printer (image writing unit) 25, an image processing unit 26, and the like. Further, the image inspection device 20b also includes an image reading unit 27 and the like. Further, the sheet discharge device 20c includes a sheet discharge unit 28 and the like.

The control unit 21 generally includes a CPU (Central Processing Unit) and memories such as a ROM (Read Only Memory) and a RAM (Random Access Memory), which are connected via a bus. The CPU controls the entire image inspection system 10 by reading instructions from the ROM or the storage unit 22 and expanding and executing the instructions in the RAM. In one or more embodiments, the control unit 21 includes an image control CPU, a non-volatile memory, a DRAM control IC (Integrated Circuit), an image memory (DRAM), an expansion IC, a writing processing unit, a compression IC, a reading processing unit, and the like. The image memory includes a compression memory and a page memory.

The storage unit 22 is configured by an HDD (Hard Disk Drive), an SSD (Solid State Drive), and the like, and stores various instructions and various kinds of information for the CPU to control each unit.

The operation panel 23 is configured by a display unit such as an LCD (Liquid Crystal Display), an operation control unit which controls an operation unit such as a touch sensor formed of a grid-shaped transparent electrode, and the like. The operation panel displays various screens (particularly, the inspection result screen to be described or the like) and enables various operations on the screen (for example, a selection operation of normality and abnormality of the image on the inspection result screen, and the like). Incidentally, the inspection result screen may be displayed on the operation panel 23 attached to the image inspection system 10 or may be displayed on a display unit or the like of an external device (for example, a client device or the like) connected on the network.

The scanner (image reading unit) 24 is a unit which optically reads image data from a document placed on a document table and is configured by CCD (Charge Coupled Devices) which convert light reflected by the document into an electrical signal, a scanner control unit which performs the operation of the CCD, the processing of the electric signal output from the CCD, or the like, and the like.

The printer (image writing unit) 25 is an engine which executes print processing on the basis of image data, and for example, is configured by an LD (Laser Diode) which irradiates a charged photosensitive drum with laser light corresponding to an image to form an electrostatic latent image, a printer control unit which performs various controls for forming an image on a sheet by visualizing an electrostatic latent image, and the like.

The image processing unit 26 is connected to the DRAM control IC of the control unit 21 via a PCI (Peripheral Components Interconnect) bus and performs image processing and functions as a controller which controls the scanner 24 and the printer 25. In one or more embodiments, the image processing unit 26 includes a controller control IC, a DRAM control IC, an image memory, a communication control unit, a NIC (Network Interface Card), and the like. The image processing unit establishes a connection with another device which is connected by a communication network such as a LAN (Local Area Network) and receives a print job from an external device (for example, a client device or the like) or transmits the image data read by the scanner 24 to the external device by electronic mail.

The image reading unit 27 is an in-line scanner which optically reads the image data from the sheet printed by the image forming device 20a or the like, and is configured by, for example, CCD which convert light reflected by the sheet into an electrical signal, or a scanner control unit which performs the operation of the CCD, the processing of the electric signal output from the CCD, and the like. Incidentally, in a case where the image forming device 20a includes an in-line scanner which scans the printed sheet after image formation, the image read by the in-line scanner may be the target of image inspection, and in that case, the image reading unit 27 can be omitted.

The sheet discharge unit 28 includes a plurality of sheet discharge trays (herein, a normal sheet discharge tray, an inspection abnormality sheet discharge tray, and a waste sheet tray) and a sheet discharge control unit which controls which sheet discharge tray the sheet is discharged to. According to the inspection result of the image inspection device 20b, the sheet discharge control unit discharges a sheet with a normal image to the normal sheet discharge tray, discharges a sheet with an abnormal image to the inspection abnormality sheet discharge tray, and discharges a waste sheet to the waste sheet tray.

FIG. 3 is a block diagram illustrating a main configuration relating to the image inspection method in the image inspection system 10 of one or more embodiments. The image inspection system 10 of one or more embodiments includes the control unit 21, the storage unit 22, the image writing unit 25, the image reading unit 27, an original image acquisition unit 30, an image inspection unit 31, an inspection result display unit 32, a selection unit 33, and the like.

The control unit 21 includes a compression IC, a compression memory, an expansion IC, a page memory 1, and a page memory 2. The control unit controls the execution of proof mode jobs and inspection mode jobs and performs a control of image input, image output, image inspection, and image display. For example, in a case where the abnormality is selected for the reference image and the normality is selected for the inspection image by the selection unit 33 to be described later, the control unit 21 replaces the reference image with the inspection image. Further, in a case where the image inspection unit 31 to be described later determines that there is a possibility of abnormality in the reference image, the control unit 21 suspends the job. Then, the control unit 21 restarts the suspended job in a case where the reference image is replaced with the inspection image, restarts the suspended job and performs recovery printing in a case where the normality is selected for the reference image, or stops the job in a case where the abnormality is selected for both the reference image and the inspection image.

Further, in a case where it is determined that there is a possibility of abnormality in the reference image, the control unit 21 discharges the inspection image in which the difference is detected and the fed succeeding sheet separately into a plurality of sheet discharge trays (normal sheet discharge trays) different from the normal sheet discharge tray (normal sheet discharge tray).

The storage unit 22 stores the reference image and the like read by the image reading unit 27.

As described above, the image writing unit 25 is the engine which executes print processing on the basis of the image data.

As described above, the image reading unit 27 is the in-line scanner which optically reads the image data from the sheet printed by the image forming device 20a or the like.

The original image acquisition unit 30 acquires print job information including an original image from the image processing unit (controller) 26 or the like.

The image inspection unit 31 performs inspection by comparing, with the image obtained by reading the sheet printed in the proof mode as the reference image, the inspection image obtained by reading the sheet printed in the inspection mode job with the reference image, and particularly determines whether or not there is a possibility of abnormality in the reference image on the basis of the difference between the reference image and the inspection image in the first copy of the job. Further, the image inspection unit 31 further determines that there is a possibility of abnormality in the reference image in a case where the original image and the inspection image are compared, there is a difference between the reference image and the inspection image, and there is no difference between the original image and the inspection image at the difference portion, determines that there is a possibility of abnormality in the reference image in a case where there is a difference between the reference image and the inspection image, and there is a difference between the original image and the reference image at the difference portion, and determines that there is a possibility of abnormality in the reference image in a case where there is no difference between the reference image and the inspection image, and there is a difference between the original image and the reference image or the inspection image.

In a case where the image inspection unit 31 determines that there is a possibility of abnormality in the reference image, the inspection result display unit 32 causes the operation panel 23 to display an inspection result screen to be described later, and the difference portion between the reference image obtained by reading the sheet printed in the proof mode job and the inspection image obtained by reading the sheet printed in the inspection mode job is displayed on the inspection result screen.

The selection unit 33 allows the user to select, on the inspection result screen displayed on the operation panel 23, a normality or an abnormality for each of the reference image obtained by reading the sheet printed in the proof mode and the inspection image obtained by reading the sheet printed in the inspection mode job.

Incidentally, the original image acquisition unit 30, the image inspection unit 31, the inspection result display unit 32, and the selection unit 33 may be configured as hardware. The control unit 21 may be configured as the image inspection instructions which run the original image acquisition unit 30, the image inspection unit 31, the inspection result display unit 32, and the selection unit 33 (particularly, the image inspection unit 31, the inspection result display unit 32, and the selection unit 33), and the image inspection instructions may be configured to be executed by the CPU of the control unit 21.

Hereinafter, a schematic operation of the image inspection system 10 having the above configuration will be described with reference to the schematic diagrams of FIGS. 4 and 5.

[Operation in Proof Mode Job (See FIG. 4)]

(1) The original image acquisition unit 30 acquires print job information including the original image from the image processing unit (controller) 26 or the like and notifies the control unit 21 of the print job information. When the print job is started, the control unit 21 compresses the original image input from the original image acquisition unit 30 with the compression IC and stores the result in the compression memory. Further, the control unit 21 decompresses the compressed image stored in the compression memory with the expansion IC and stores the result in the page memory 1.

(2) The control unit 21 transmits the original image stored in the page memory 1 to the image writing unit 25 and instructs the output of the original image.

(3) The image writing unit 25 writes the original image on the printed sheet and, when the discharging of the printed sheet is completed, notifies the control unit 21 of the output completion of the printed sheet.

(4) The control unit 21 instructs the image reading unit 27 to read an image.

(5) The image reading unit 27 reads the printed sheet, transmits the read image to the control unit 21, and notifies the control unit 21 of the reading completion of the image. The control unit 21 stores the read image in the page memory 2.

(6) The control unit 21 stores the read image stored in the page memory 2 in the storage unit 22 as a reference image.

[Operation in Inspection Mode Job (See FIG. 5)]

(1) The original image acquisition unit 30 acquires print job information including the original image from the image processing unit (controller) 26 or the like and notifies the control unit 21 of the print job information. When the print job is started, the control unit 21 compresses the original image input from the original image acquisition unit 30 with the compression IC and stores the result in the compression memory. Further, the control unit 21 decompresses the compressed image stored in the compression memory with the expansion IC and stores the result in the page memory 1.

(2) The control unit 21 transmits the original image stored in the page memory 1 to the image writing unit 25 and instructs the output of the original image.

(3) The image writing unit 25 writes the original image on the printed sheet and, when the discharging of the printed sheet is completed, notifies the control unit 21 of the output completion of the printed sheet.

(4) The control unit 21 instructs the image reading unit 27 to read an image.

(5) The image reading unit 27 reads the printed sheet, transmits the read image to the control unit 21, and notifies the control unit 21 of the reading completion of the image. The control unit 21 stores the read image (inspection image) in the page memory 2.

(6) The control unit 21 reads the reference image from the storage unit 22 and stores the image in the page memory 2.

(7) The control unit 21 instructs the image inspection unit 31 to perform an image inspection (a difference inspection between the reference image and the inspection image).

(8) The image inspection unit 31 performs the image inspection using the reference image and the inspection image stored in the page memory 2, and notifies the control unit 21 of the image inspection result.

(9) The control unit 21 instructs the image inspection unit 31 to perform an image inspection (a difference inspection between the original image, the reference image, and the inspection image) as necessary.

(10) The image inspection unit 31 performs the image inspection using the original image stored in the page memory 1 and the reference image and the inspection image stored in the page memory 2 as necessary and notifies the control unit 21 of the image inspection result.

(11) In a case where it is determined as a result of the image inspection that there is a possibility of abnormality in the reference image, the control unit 21 suspends the print job (inspection mode job) and instructs the inspection result display unit 32 to display the reference image and the inspection image and to display the difference portion. The inspection result display unit 32 displays the reference image and the inspection image on the operation panel 23 and displays the difference portion therebetween.

(12) The selection unit 33 allows the user to select a normality or an abnormality for each of the reference image and the inspection image and notifies the control unit 21 of the selection result (specified value). Then, the control unit 21 controls the processing of the print job according to the specified value. For example, in a case where the normality is selected for the reference image, and the normality is selected for the inspection image, the suspended print job is restarted. Further, in a case where the normality is selected for the reference image, and the abnormality is selected for the inspection image, the suspended print job is restarted, and recovery printing is performed. Further, in a case where the abnormality is selected for the reference image, and the normality is selected for the inspection image, the inspection image is stored as the reference image (replacement of the reference image with the inspection image) in the storage unit 22, and the suspended print job is restarted. At that time, the original reference image is deleted from the storage unit 22. Further, in a case where the abnormality is selected for the reference image, and the abnormality is selected for the inspection image, the print job is stopped.

Hereinafter, the operation of the image inspection system 10 of one or more embodiments will be described below. The CPU configuring the control unit 21 executes the processing of each step shown in the flowcharts of FIGS. 6, 9 and 10 by expanding the image inspection instructions stored in the ROM or the storage unit 22 into the RAM.

FIG. 6 is an example of a workflow in one or more embodiments. The control unit 21 executes the proof mode job and registers the image obtained by reading the sheet on which the original image is printed as the reference image (S101). Next, the user visually confirms the printed matter in the proof mode (S102) and determines whether or not there is an abnormality in the printed sheet (S103). In a case where an abnormality is found (Yes in S103), the image obtained by reading the sheet printed in the proof mode cannot be used as the reference image, the process returns to S101, and the control unit 21 executes the proof mode job again.

On the other hand, in a case where no abnormality is found (No in S103), the control unit 21 executes the inspection mode job (a job for main printing) (S104). Next, the image inspection unit 31 determines whether or not the sheet is the first copy of the main printing (S105) and, in the case of the first copy (Yes in S105), determines whether or not there is a possibility of abnormality in the reference image (S106). The details of this determination will be described later. In a case where it is determined that there is a possibility of abnormality in the reference image (Yes in S106), the control unit 21 suspends the job, the inspection result display unit 32 displays the reference image, the inspection image, and the difference portion therebetween, and the selection unit 33 allows the user to select the normality or the abnormality for each of the reference image and the inspection image (S107).

Next, the control unit 21 determines whether or not the abnormality is selected for both the reference image and the inspection image (S108). In a case where the abnormality is selected for both the reference image and the inspection image (Yes in S108), the job cannot be continued, and thus, the job is stopped, the process returns to S101, and the proof mode job is executed again. In a case where the abnormality is not selected for at least one of the reference image and the inspection image (No in S108), the control unit 21 determines whether or not the abnormality is selected for the reference image, and the normality is selected for the inspection image. In a case where the abnormality is selected for the reference image, and the normality is selected for the inspection image (Yes in S109), the reference image is replaced with the inspection image, and then the job is restarted (S110).

After the reference image is replaced with the inspection image, in a case where the sheet is not the first copy of the main printing (No in S105), in a case where it is determined that there is no possibility of abnormality in the reference image (No in S106), or in a case where the abnormality is selected for the reference image, and the normality is selected for the inspection image (that is, the normality is selected for the reference image, and the abnormality is selected for the inspection image, or the normality is selected for both the reference image and the inspection image), the control unit 21 determines whether or not a difference is detected between the reference image and the inspection image (S111). In a case where a difference is detected between the reference image and the inspection image (Yes in S111), the control unit 21 performs the recovery printing (S112). Thereafter, the control unit 21 determines whether or not the sheet is the final copy of the job (S113). In a case where the printing is not the final copy (No in S113), the process returns to S105 to repeat the same processing, and in a case where the sheet is the final copy (S113: Yes), the job is ended.

Incidentally, in a case where the normality is selected for both the reference image and the inspection image in S109, and there is the difference between the reference image and the inspection image in S111, the recovery printing is performed in S112. However, in a case where there is the difference between the reference image and the inspection image, but the user determines that the difference is acceptable, the job may be suspended and guided to a screen for adjusting inspection level setting.

Further, in a case where the user detects an abnormality in the printed matter in the proof mode job in S103, the process returns to S101, and the proof mode job is executed again. However, in one or more embodiments, the reference image in which an abnormality is mixed can be replaced with the inspection image in the first copy of the inspection mode job, and thus this determination itself may be omitted.

Hereinafter, the image inspection method of one or more embodiments will be specifically described with reference to the drawings. FIG. 7 is an operation example when the user overlooks a stain on the printed matter in the proof mode in one or more embodiments. The upper stage is the reference image read in the proof mode job, and the lower stage is the inspection image read in the inspection mode job. Further, the numbers in the rectangular frames are page numbers, and different types of hatching are applied to the reference image and the inspection image so that the reference image and the inspection image can be distinguished from each other.

As illustrated in FIG. 7, it is assumed that in a print job of eight pages, a stain is attached to the fourth page in the proof mode job. In a case where the user visually confirms the printed matter in the proof mode, and the stain on the fourth page is overlooked, the stain is mixed in the reference image. Even in a case where the fourth page of the inspection mode job to be executed continuously has no stains and is printed normally, a difference is detected in the comparison inspection with the reference image obtained by reading the sheet printed in the proof mode, and thus it is determined to be abnormal. In this example of the image inspection device, in order to keep the output order of the printed sheets, the fed fifth and sixth pages are also discharged together with the fourth page in which the abnormality is detected.

Here, in one or more embodiments, in the case of the first copy of the inspection mode job, the recovery printing is not immediately performed, the inspection mode job is suspended, and the user is allowed to select a normality or an abnormality for each of the reference image and the inspection image in such a manner that the reference image and the inspection image are displayed, and the difference portion therebetween is displayed on the inspection result screen 40 as illustrated in FIG. 8. Further, in a case where the abnormality is selected for the reference image, and the normality is selected for the inspection image, the reference image is replaced with the inspection image, and the inspection mode job is restarted. In a case where the sheet in which the difference is detected is discharged to the inspection abnormality sheet discharge tray, or the succeeding sheet is discharged to the waste sheet tray, the recovery printing is performed. Further, in a case where the normality is selected for the reference image, and the abnormality is selected for the inspection image, the inspection mode job is restarted, and recovery printing is performed. Further, in a case where the normality is selected for the reference image, and the normality is also selected for the inspection image, the inspection mode job is restarted. In a case where the sheet in which the difference is detected is discharged to the inspection abnormality sheet discharge tray, or the succeeding sheet is discharged to the waste sheet tray, the recovery printing is performed.

Further, in a case where the abnormality is selected for the reference image, and the abnormality is selected for the inspection image, the inspection mode job is stopped.

Next, the display of the reference image, the inspection image, and the difference portion therebetween, and the selection of normality and abnormality for the reference image and the inspection image will be described with reference to FIG. 8. In a case where the difference between the reference image and the inspection image is detected in the first copy of the inspection mode job, the inspection mode job is suspended, and the reference image, the inspection image, and the difference portion therebetween are displayed. FIG. 8 is an example of the inspection result screen 40 when the difference is detected between the image (reference image) obtained by reading the sheet printed in the proof mode and the inspection image on the fifth page of the first copy of the inspection mode job.

The inspection result display unit 32 displays, on the inspection result screen 40, the image (reference image) obtained by reading the sheet printed in the proof mode and the inspection image side by side, and displays the difference portion between the reference image and the inspection image on the inspection image side. Incidentally, the difference portion may be displayed on the reference image side or on both sides. Then, the selection unit 33 allows a selection of a normality or an abnormality for each of the reference image and the inspection image on the inspection result screen 40. For example, the user selects a reference image normality button in a case where it is determined that there is no problem in the reference image and selects a reference image abnormality button in a case where it is determined that there is a problem in the reference image. Similarly, an inspection image normality button is selected in a case where it is determined that there is no problem in the inspection image, and an inspection image abnormality button is selected in a case where it is determined that there is a problem in the inspection image.

In a case where the user determines that there is a problem in the reference image, and there is no problem in the inspection image, the control unit 21 replaces the reference image with the inspection image. Then, after the second copy, the image inspection unit 31 performs the image inspection on the basis of the replaced reference image. Incidentally, herein, the inspection result screen 40 is displayed in a case where the difference between the reference image and the inspection image is detected in the first copy of the inspection mode job. However, the inspection result screen 40 may be displayed in all the copies of the inspection mode job, or the inspection result screen 40 may be displayed only in a case where it is determined that there is a possibility of abnormality in the reference image.

In this way, even in a case where an abnormality such as a stain is mixed in the reference image created in the proof mode job, in a case where the difference between the reference image and the inspection image is detected in the first copy of the inspection mode job, the job is suspended, and the user is allowed to confirm the difference and to select a normality or an abnormality for each of the reference image and the inspection image. In a case where the abnormality is selected for the reference image, and the normality is selected for the inspection image, the reference image is replaced with the inspection image, and thus the image inspection can be appropriately performed without executing recovery printing many times and reprinting all pages in the proof mode job.

Herein, in a case where a difference is detected between the reference image and the inspection image (No in S105 and Yes in S111 in FIG. 6), the difference is detected, and the job is suspended even in a case where there is no problem in the reference image, and there is a problem and the inspection image. Thus, a productivity is reduced. In that case, an inspection method in which the image inspection is performed using the original image can be used. For example, when the difference inspection between the reference image and the original image, and the inspection image and the original image is performed with the difference detection between the reference image and the inspection image, it is determined whether or not there is a possibility of abnormality in the reference image, and in a case where there is a possibility of abnormality in the reference image, the job is suspended. Hereinafter, the operation of the image inspection system 10 in this case will be described with reference to FIGS. 9 and 10. Incidentally, FIGS. 9 and 10 are divided for convenience of drawing and illustrate a series of operations.

As illustrated in FIG. 9, first, the original image acquisition unit 30 receives an original image from the image processing unit (controller) 26 or the like (S201). Next, the printer (image writing unit) 25 feeds a printed sheet from a sheet feeding tray (S202) and prints the original image on the printed sheet (S203). Next, the image reading unit 27 reads the printed sheet on which the original image is printed (S204), and the image inspection unit 31 performs the difference inspection by comparing the reference image obtained by reading the sheet printed in the proof mode, the original image, and the inspection image (S205).

Next, the control unit 21 determines whether the sheet is the first copy of the main printing (S206), and in the case of the first copy of the main print (Yes in S206), by the difference inspection, the image inspection unit 31 determines whether or not there is a difference between the reference image and the inspection image (S207).

In a case where there is a difference between the reference image and the inspection image (Yes in S207), by the difference inspection, the image inspection unit 31 determines whether there is a difference between the original image and the reference image, or determines whether or not there is a difference between the original image and the inspection image (S208). In a case where there is a difference between the original image and the reference image, or there is no difference between the original image and the inspection image (Yes in S208), the image inspection unit 31 determines that there is a possibility of abnormality in the reference image (S209).

Further, in a case where there is no difference between the original image and the reference image, and there is a difference between the original image and the inspection image (No in S208), the image inspection unit 31 determines that there is no possibility of abnormality in the reference image (S210).

Further, in a case where there is no difference between the reference image and the inspection image (No in S207), the image inspection unit 31 determines whether or not there is a difference between the original image and the reference image (or the inspection image) (S211). In a case where there is a difference between the original image and the reference image (or the inspection image) (Yes in S211), the image inspection unit 31 determines that there is a possibility of abnormality in the reference image (S212). Further, in a case where there is no difference from the reference image (or inspection image) (No in S211), and in a case where the sheet is not the first copy of the main printing (No in S206), the image inspection unit 31 determines that there is no possibility of abnormality in the reference image (S213).

As the determination results of S207, S208, and S211, in a case where there is no possibility of abnormality in the reference image (No in S214), it is determined from the difference inspection in S205 whether or not there is a difference between the reference image and the inspection image (S215).

In a case where there is no difference between the reference image and the inspection image (No in S215), the control unit 21 discharges the printed sheet to the normal sheet discharge tray (S218). In a case where there is a difference between the reference image and the inspection image (Yes in S215), the control unit 21 discharges the sheet in which the difference is detected to the inspection abnormality sheet discharge tray and discharges the succeeding sheet to the waste sheet tray (S216) and performs a recovery printing instruction on the image processing unit (controller) 26 (S217). After that, the control unit 21 determines whether or not the printing of all pages is completed (S219), and in a case where the printing of all pages is not completed (No in S219), the process returns to S201 to receive the next original image.

On the other hand, in a case where there is a possibility of abnormality in the reference image (Yes in S214), the process proceeds to FIG. 10, and the control unit 21 suspends the print job (S220), and discharges the sheet in which a difference is detected to the inspection abnormality sheet discharge tray and discharges the succeeding sheet to the waste sheet tray (S221). Next, the inspection result display unit 32 displays the reference image and the inspection image (S222). Thereafter, in a case where it is determined in S207 that there is a difference between the reference image and the inspection image, the difference portion between the reference image and the inspection image is clearly indicated. Further, in a case where it is determined from the determination results of S207, S208, and S211 that there is no difference between the reference image and the inspection image, and there is a difference between the original image and the inspection image, the difference portion between the original image and the inspection image is clearly indicated. Then, the selection unit 33 allows the user to select a normality or an abnormality for each of the reference image and the inspection image (S223).

In a case where the normality is selected for the reference image (Yes in S224), the control unit 21 restarts the print job and instructs the image processing unit (controller) 26 to perform the recovery printing (S225) after the sheet in which the difference is detected in S221 and the succeeding sheet are discharged, and the process proceeds to S219 in FIG. 9. Further, in a case where the abnormality is selected for the reference image (No in S224), it is determined whether or not the normality is selected for the inspection image (S226). In a case where the normality is selected for the inspection image (Yes in S226), the control unit 21 replaces the reference image with the inspection image (S227), then restarts the print job, and instructs the image processing unit (controller) 26 to perform the recovery printing (S225) after the sheet in which the difference is detected in S221 and the succeeding sheet are discharged, and the process proceeds to S219 in FIG. 9. Further, in a case where the abnormality is selected for the inspection image (No in S226), it is impossible to correctly determine the difference. Thus, the control unit 21 stops the print job (S228), and the process proceeds to S219 in FIG. 9.

As described above, in a case where the same difference is found between the original image and the reference image simply as well as the difference is detected between the reference image and the inspection image, the print job is suspended, and the difference portion is displayed. Thus, there is no reduction in productivity caused when the difference is detected, and the job is suspended in a case where there is no problem in the reference image, and there is a problem in the inspection image. Further, even when a difference is not detected between the reference image and the inspection image, it is inspected whether or not there is a difference in the same position between the original image and the inspection image. Thus, it is possible to prevent a situation that an inspection abnormality does not occur in a case where there is the same abnormality in both the reference image and the inspection image. Further, in a case where it is determined that there is a possibility of abnormality in the reference image, the user is allowed to select a normality or an abnormality for each of the reference image and the inspection image. In a case where the abnormality is selected for the reference image, and the normality is selected for the inspection image, the reference image is replaced with the inspection image determined by the user to be non-defective. Thus, erroneous detection can be prevented in the second and subsequent copies.

Next, a method of determining the possibility of abnormality with respect to the reference image obtained by reading the sheet printed in the proof mode will be specifically described with reference to FIGS. 11A to 15. Incidentally, in FIGS. 11A to 14B, the numbers in the rectangular frames are page numbers, and different types of hatching are applied to the reference image and the inspection image so that the reference image, the inspection image, and the original image can be distinguished from each other.

Figure 11A:
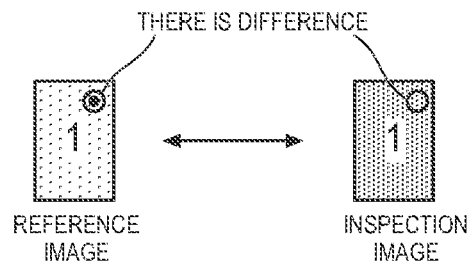
FIGS. 11A and 11B are schematic diagrams illustrating a case where there is a possibility of abnormality in a reference image in image inspection according to one or more embodiments of the present invention.
Figure 11B:
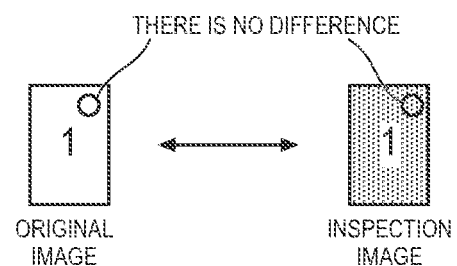

In a case where there is a difference in the same portion between the reference image and the inspection image obtained by reading the sheet printed in the proof mode as illustrated in FIG. 11A, and there is no difference in the same portion between the original image and the inspection image as illustrated in FIG. 11B, it is determined that there is a possibility of abnormality in the reference image.

Figure 12A:
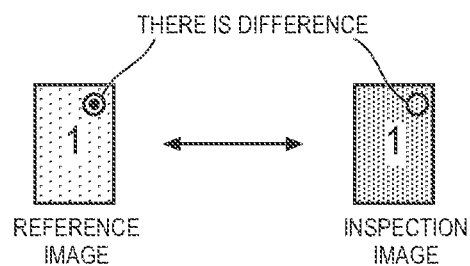
FIGS. 12A and 12B are schematic diagrams illustrating a case where there is a possibility of abnormality in the reference image in the image inspection according to one or more embodiments of the present invention.
Figure 12B:
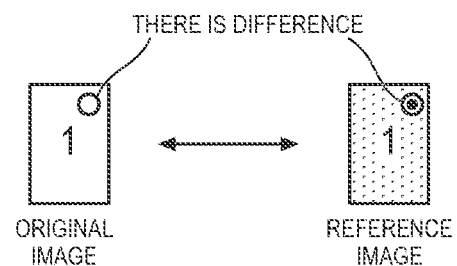

Further, in a case where there is a difference in the same portion between the reference image and the inspection image obtained by reading the sheet printed in the proof mode as illustrated in FIG. 12A, and there is a difference in the same portion between the original image and the reference image as illustrated in FIG. 12B, it is determined that there is a possibility of abnormality in the reference image.

Figure 13A:
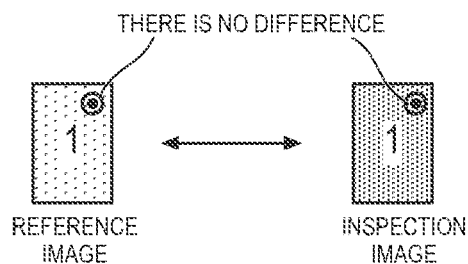
FIGS. 13A and 13B are schematic diagrams illustrating a case where there is a possibility of abnormality in the reference image in the image inspection according to one or more embodiments of the present invention.
Figure 13B:
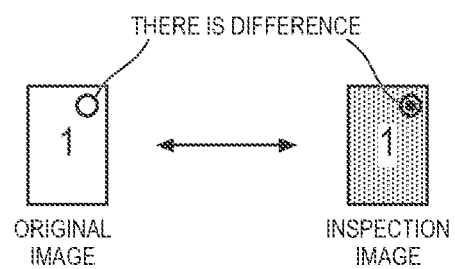

Further, even in a case where there is no difference between the reference image and the inspection image obtained by reading the sheet printed in the proof mode as illustrated in FIG. 13A, and there is a difference between the original image and the inspection image as illustrated in FIG. 13B, it is determined that there is a possibility of abnormality in the reference image.

Figure 14A:
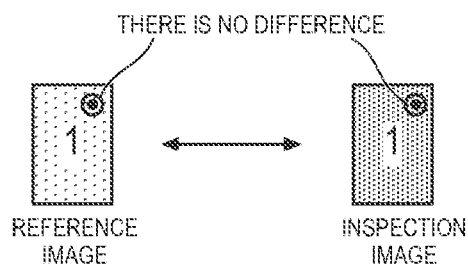
FIGS. 14A and 14B are schematic diagrams illustrating a case where there is a possibility of abnormality in the reference image in the image inspection according to one or more embodiments of the present invention.
Figure 14B:
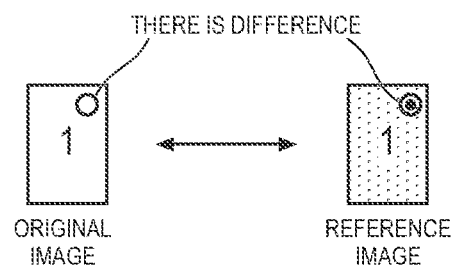
Figure 15:
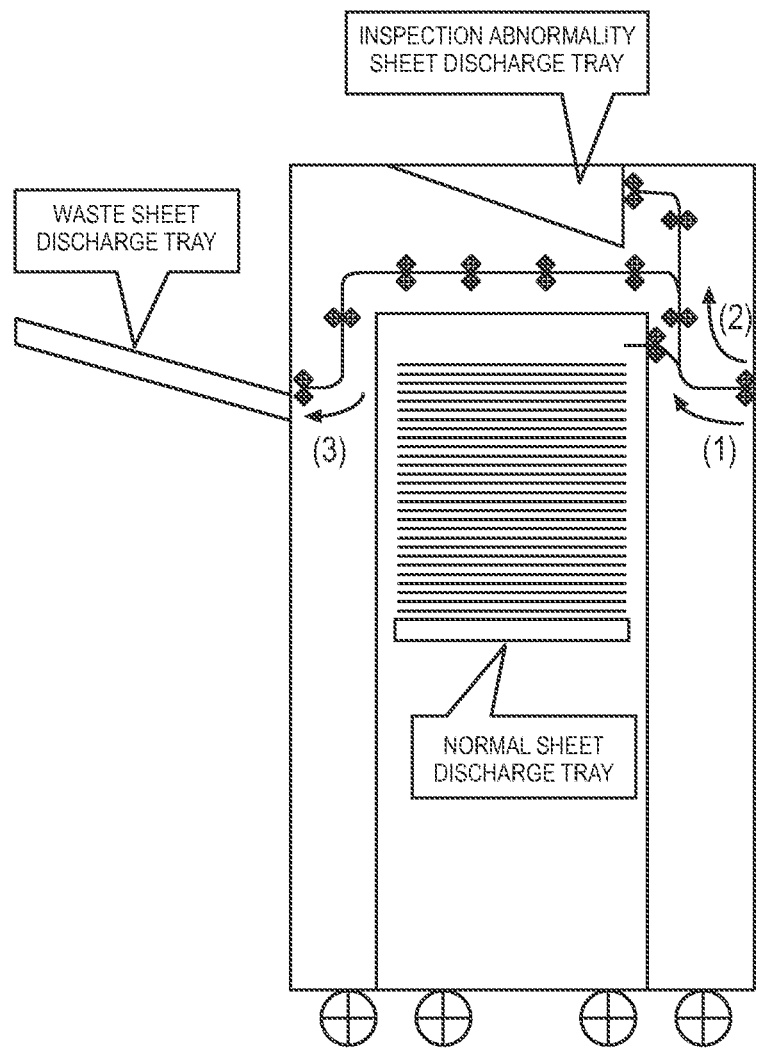
FIG. 15 is a schematic diagram illustrating a configuration of a sheet discharge device of the image inspection system according to one or more embodiments of the present invention.

Further, even in a case where there is no difference between the reference image and the inspection image obtained by reading the sheet printed in the proof mode as illustrated in FIG. 14A, and there is a difference between the original image and the reference image as illustrated in FIG. 14B, it is determined that there is a possibility of abnormality in the reference image.

Next, an example of the sheet discharge device 20c of the image inspection system 10 will be described with reference to FIG. 15. Even when a difference between the reference image and the inspection image is clearly indicated by the inspection result display unit 32, in the case of a very small stain or the like, it may be difficult to visually recognize the difference. In this regard, as illustrated in FIG. 15, the sheet determined to be normal by the image inspection unit 31 is discharged to the normal sheet discharge tray through the route of (1), and the sheet determined to be abnormal is discharged to the inspection abnormality sheet discharge tray through the route of (2). Further, in a case where the image inspection unit 31 determines an inspection abnormality, the succeeding sheet of the fed sheet determined as the inspection abnormality is discharged to the waste sheet discharge tray through the route of (3). In this way, when the sheet determined as the inspection abnormality is discharged separately from the waste sheet, the sheet output actually is easily found even in a case where the difference indicated by the inspection result display unit 32 is difficult to recognize. Thus, the difference portion can be easily confirmed.

Incidentally, the present invention is not limited to the above embodiments, and the configuration and control thereof can be appropriately changed without departing from the spirit of the present invention.

For example, in the above embodiments, the image inspection system 10 in which the image forming device 20a and the image inspection device 20b are integrally formed has been described. However, the image inspection method of one or more embodiments of the present invention can be similarly applied even to a case where the image inspection device 20*b* is operated by itself. In that case, the image forming device 20*a* and the image inspection device 20*b* are communicably connected to each other, and the image inspection device 20*b* may be provided with the control unit 21, the storage unit 22, the operation panel 23, the original image acquisition unit 30, the image inspection unit 31, the inspection result display unit 32, the selection unit 33, and the like.

One or more embodiments of the present invention can be used for an image inspection device which inspects an image obtained by reading a sheet on which an original image is printed, an image inspection method using the image inspection device, image inspection instructions which operate in the image inspection device, and a recording medium in which the image inspection instructions are recorded.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image inspection device that inspects an inspection image obtained by reading an original image that is printed on a sheet based on a job, the image inspection device comprising:
a hardware processor that:
performs inspection by comparing the inspection image with a reference image that is obtained by reading the original image that is printed on the sheet in a proof mode;
determines whether a possibility of abnormality exists in the reference image based on a difference between the reference image and the inspection image;
displays a difference portion between the reference image and the inspection image when determining that the possibility of abnormality exists in the reference image;
receives a selection of a normality or an abnormality for each of the reference image and the inspection image; and
replaces the reference image with the inspection image when the abnormality is selected for the reference image and the normality is selected for the inspection image.

2. The image inspection device according to claim 1, wherein the hardware processor determines whether the possibility of abnormality exists in the reference image in a first copy of the job.

3. The image inspection device according to claim 1, wherein
the hardware processor further:
compares the original image and the inspection image, and
determines that the possibility of abnormality exists in the reference image when there is a difference between the reference image and the inspection image and there is no difference between the original image and the inspection image at the difference portion.

4. The image inspection device according to claim 1, wherein
the hardware processor further:
compares the original image and the inspection image, and
determines that the possibility of abnormality exists in the reference image when there is a difference between the reference image and the inspection image and there is a difference between the original image and the reference image at the difference portion.

5. The image inspection device according to claim 1, wherein
the hardware processor further:
compares the original image and the inspection image, and
determines that the possibility of abnormality exists in the reference image when there is no difference between the reference image and the inspection image and there is a difference between the original image and the reference image or between the original image and the inspection image.

6. The image inspection device according to claim 1, wherein the hardware processor suspends the job when determining that the possibility of abnormality exists in the reference image.

7. The image inspection device according to claim 6, wherein the hardware processor restarts the suspended job after replacing the reference image with the inspection image.

8. The image inspection device according to claim 6, wherein the hardware processor restarts the suspended job and performs recovery printing when the normality is selected for the reference image.

9. The image inspection device according to claim 6, wherein the hardware processor stops the job when the abnormality is selected for both of the reference image and the inspection image.

10. The image inspection device according to claim 1, further comprising:
a plurality of sheet discharge trays different from a normal sheet discharge tray, wherein
when determining that the possibility of abnormality exists in the reference image, the hardware processor discharges a sheet in which the difference is detected and a fed succeeding sheet separately to the plurality of sheet discharge trays.

11. An image inspection method in an image inspection device that inspects an inspection image obtained by reading a sheet on which an original image is printed based on a job, the method comprising:
performing inspection by comparing the inspection image with a reference image that is obtained by reading the original image that is printed on the sheet in a proof mode and determining whether a possibility of abnormality exists in the reference image based on a difference between the reference image and the inspection image;
displaying a difference portion between the reference image and the inspection image when determining that the possibility of abnormality exists in the reference image;
receiving a selection of a normality or an abnormality for each of the reference image and the inspection image; and
replacing the reference image with the inspection image when the abnormality is selected for the reference image and the normality is selected for the inspection image.

12. The image inspection method according to claim 11, wherein the performing comprises:

determining whether the possibility of abnormality exists in the reference image in a first copy of the job.

13. The image inspection method according to claim 11, wherein the performing further comprises:
    comparing the original image and the inspection image; and
    determining that the possibility of abnormality exists in the reference image when there is a difference between the reference image and the inspection image and there is no difference between the original image and the inspection image at the difference portion.

14. The image inspection method according to claim 11, wherein the performing further comprises:
    comparing the original image and the inspection image; and
    determining that the possibility of abnormality exists in the reference image when there is a difference between the reference image and the inspection image and there is a difference between the original image and the reference image at the difference portion.

15. The image inspection method according to claim 11, wherein the performing further comprises:
    comparing the original image and the inspection image; and
    determining that the possibility of abnormality exists in the reference image when there is no difference between the reference image and the inspection image and there is a difference between the original image and the reference image or between the original image and the inspection image.

16. The image inspection method according to claim 11, wherein the method further comprises:
    suspending the job when determining that the possibility of abnormality exists in the reference image.

17. The image inspection method according to claim 16, wherein the method further comprises:
    restarting the suspended job after the reference image is replaced with the inspection image.

18. The image inspection method according to claim 16, wherein the method further comprises:
    restarting the suspended job and performing recovery printing when the normality is selected for the reference image.

19. The image inspection method according to claim 16, wherein the method further comprises:
    stopping the job when the abnormality is selected for both of the reference image and the inspection image.

20. The image inspection method according to claim 11, wherein
    the image inspection device comprises a plurality of sheet discharge trays different from a normal sheet discharge tray, and
    the method further comprises:
        when determining that the possibility of abnormality exists in the reference image, discharging a sheet in which the difference is detected and a fed succeeding sheet separately to the plurality of sheet discharge trays.

21. A non-transitory recording medium storing computer readable image inspection instructions that operate in an image inspection device that inspects an inspection image obtained by reading an original image that is printed on a sheet based on a job, the instructions causing a computer to execute:
    performing inspection by comparing the inspection image with a reference image that is obtained by reading the original image is printed on the sheet in a proof mode;
    determining whether a possibility of abnormality exists in the reference image based on a difference between the reference image and the inspection image;
    displaying a difference portion between the reference image and the inspection image when determining that the possibility of abnormality exists in the reference image;
    receiving a selection of a normality or an abnormality for each of the reference image and the inspection image; and
    replacing the reference image with the inspection image when the abnormality is selected for the reference image and the normality is selected for the inspection image.

* * * * *